United States Patent
Saito et al.

(10) Patent No.: US 10,293,749 B2
(45) Date of Patent: May 21, 2019

(54) VEHICLE CONTROL DEVICE AND VEHICLE

(71) Applicant: SUBARU CORPORATION, Tokyo (JP)

(72) Inventors: Hirotaka Saito, Tokyo (JP); Junya Seki, Tokyo (JP); Kazufumi Suzuki, Tokyo (JP); Yuki Osada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 2 days.

(21) Appl. No.: 15/459,200

(22) Filed: Mar. 15, 2017

(65) Prior Publication Data

US 2017/0282798 A1   Oct. 5, 2017

(30) Foreign Application Priority Data

Mar. 31, 2016   (JP) .................................. 2016-071125

(51) Int. Cl.
*B60R 1/00* (2006.01)
*B60Q 1/00* (2006.01)
(Continued)

(52) U.S. Cl.
CPC .............. *B60R 1/00* (2013.01); *B60Q 1/0023* (2013.01); *B60Q 1/04* (2013.01); *G01J 1/4257* (2013.01); *G01S 7/4808* (2013.01); *G01S 13/865* (2013.01); *G01S 13/867* (2013.01); *G01S 13/931* (2013.01); *G01S 17/023* (2013.01); *G01S 17/026* (2013.01); *G01S 17/87* (2013.01); *G01S 17/936* (2013.01); *G06T 19/006* (2013.01); *B60R 2300/107* (2013.01);
(Continued)

(58) Field of Classification Search
None
See application file for complete search history.

(56) References Cited

U.S. PATENT DOCUMENTS 8,941,303 B2 * 1/2015 Foltin .................... B60Q 1/115
315/82
2011/0242320 A1 * 10/2011 Yamada .................. B60Q 1/04
348/148

(Continued)

FOREIGN PATENT DOCUMENTS

JP         4735090 B2    7/2011
JP         5392470 B2    1/2014

*Primary Examiner* — Tize Ma
(74) *Attorney, Agent, or Firm* — McDermott Will & Emery LLP (57) ABSTRACT

Provided is a vehicle control device mounted on a vehicle including headlights. The vehicle control device includes an environment recognition unit, an image generation unit, an image display unit, and an illumination range detector. The environment recognition unit acquires surrounding environment formation around the vehicle. The image generation unit generates, on a basis of the surrounding environment information, an environment image that includes forward environment information on environment forward of the own vehicle. The image display unit displays the environment image. The illumination range detector detects an illumination range, in which the illumination range is illuminated by the headlights. The environment image solely includes information acquired inside the illumination range.

7 Claims, 5 Drawing Sheets

(51) Int. Cl.
*B60Q 1/04* (2006.01)
*G06T 19/00* (2011.01)
*G01J 1/42* (2006.01)
*G01S 17/02* (2006.01)
*G01S 17/87* (2006.01)
*G01S 17/93* (2006.01)
*G01S 7/48* (2006.01)
*G01S 13/86* (2006.01)
*G01S 13/93* (2006.01)

(52) U.S. Cl.
CPC ... *B60R 2300/205* (2013.01); *B60R 2300/301* (2013.01); *B60R 2300/8086* (2013.01); *G01J 2001/4247* (2013.01); *G01S 2013/936* (2013.01); *G01S 2013/9332* (2013.01); *G01S 2013/9385* (2013.01)

(56) References Cited

U.S. PATENT DOCUMENTS

2017/0106750 A1* 4/2017 Tauchi .................. B60K 35/00
2018/0137375 A1* 5/2018 Takemura ............... B60R 21/00

* cited by examiner

VEHICLE CONTROL DEVICE AND VEHICLE

CROSS-REFERENCE TO RELATED APPLICATIONS

The present application claims priority from Japanese Patent Application No. 2016-071125 filed on Mar. 31, 2016, the entire contents of which are hereby incorporated by reference.

BACKGROUND

The technology relates to a vehicle control device and a vehicle including the vehicle control device, e.g., an automobile.

Various proposals have been put forward for display devices in vehicles such as automobiles. The display devices may recognize environment forward of an own vehicle with various kinds of environment recognition units, and provide image display of information on, for example but not limited to, a lane shape and an obstacle.

Use of such display devices makes it possible for an occupant to acquire various pieces of information useful for operation of the vehicle. The display devices are useful, not only as a driving assistant when the occupant drives the vehicle as a driver, but also for a purpose of the occupant's supervision of validity of an automatic operation control in a vehicle that performs automatic operation.

In particular, the use of the display devices is considered to be effective in night-time traveling in which external environment is less visible to the occupant himself or herself.

The following is some examples of existing techniques regarding image display of the environment around the own vehicle in the night-time traveling. Japanese Unexamined Patent Application Publication (JP-A) No. 2007-015660 describes that infrared light is sent forward of the vehicle in the night-time traveling, while an infrared image forward of the vehicle is captured by an infrared camera and is displayed. The infrared image thus displayed may be utilized as a supplement to the driver's visual check of, for example but not limited to, an obstacle in a region illuminated by headlights.

JP-A No. 2010-176591 describes a display device for a vehicle that includes a light-emitting body installed in an instrumental panel of the vehicle. The display device causes reflection of light emission at a front windshield, to transmit information to the driver. Upon detection of a pedestrian or any other object, the display device displays an alarm mark at a corresponding position. When the pedestrian or other objects exist outside an illumination range of headlights, the display device displays an image of a pseudo human body.

SUMMARY

In recent years, enhancement in techniques of environment recognition of the vehicle with use of cameras, radar, and laser scanners has made it possible to display detailed information on the obstacle or any other object, so as to provide the driver with driving assistance. It is also possible to perform, on the basis of a result of the environment recognition, the automatic operation control that involves performing the automatic operation of the vehicle.

However, even in a case with use of the techniques of the environment recognition in the driving assistance or the automatic operation, the occupant is still responsible for visually checking situation around the vehicle by himself or herself and ensuring safety. It would not be desirable to be too ready to believe a recognition result of the environment recognition units.

It is therefore desirable to provide a vehicle control device and a vehicle including the vehicle control device that make it possible to prevent an occupant from placing too much confidence in an environment recognition unit in traveling in a dark place.

An aspect of the technology provides a vehicle control device mounted on a vehicle including headlights. The vehicle control device includes an environment recognition unit, an image generation unit, an image display unit, and an illumination range detector. The environment recognition unit acquires surrounding environment information around the vehicle. The image generation unit generates, on a basis of the surrounding environment information, an environment image that includes forward environment information on environment forward of the own vehicle. The image display unit displays the environment image. The illumination range detector detects an illumination range, in which the illumination range is illuminated by the headlights. The environment image solely includes information acquired inside the illumination range.

The environment image may include depiction of an outer edge of the illumination range. The depiction of the outer edge of the illumination range may be superimposed on the surrounding environment information.

The vehicle control device may further include an imaging unit that captures an image forward of the vehicle. The illumination range detector may detect, as the illumination range, a range in which the imaging unit detects reflection light of illumination light of the headlights.

The illumination range detector may detect the illumination range, on a basis of information on a pattern of light distribution of the headlights.

An aspect of the technology provides a vehicle including headlights, an environment recognition unit, an image generation unit, an image display unit, and an illumination range detector. The environment recognition unit acquires surrounding environment information around the vehicle. The image generation unit generates, on a basis of the surrounding environment information, an environment image that includes forward environment information on environment forward of the own vehicle. The image display unit displays the environment image. The illumination range detector detects an illumination range, in which the illumination range is illuminated by the headlights. The environment image solely includes information acquired inside the illumination range.

DETAILED DESCRIPTION

A vehicle control device and a vehicle according to one example implementation may provide display solely of a lane shape and an object such as an obstacle recognized inside an illumination range of headlights, when the headlights are lighted. This makes it possible to prevent an occupant from placing too much confidence in an environment recognition unit traveling in a dark place.

In the following, some implementations of the technology are described with reference to the drawings. The following description of the implementations is given on a case with a vehicle control device to which the implementations are applied.

Figure 1:
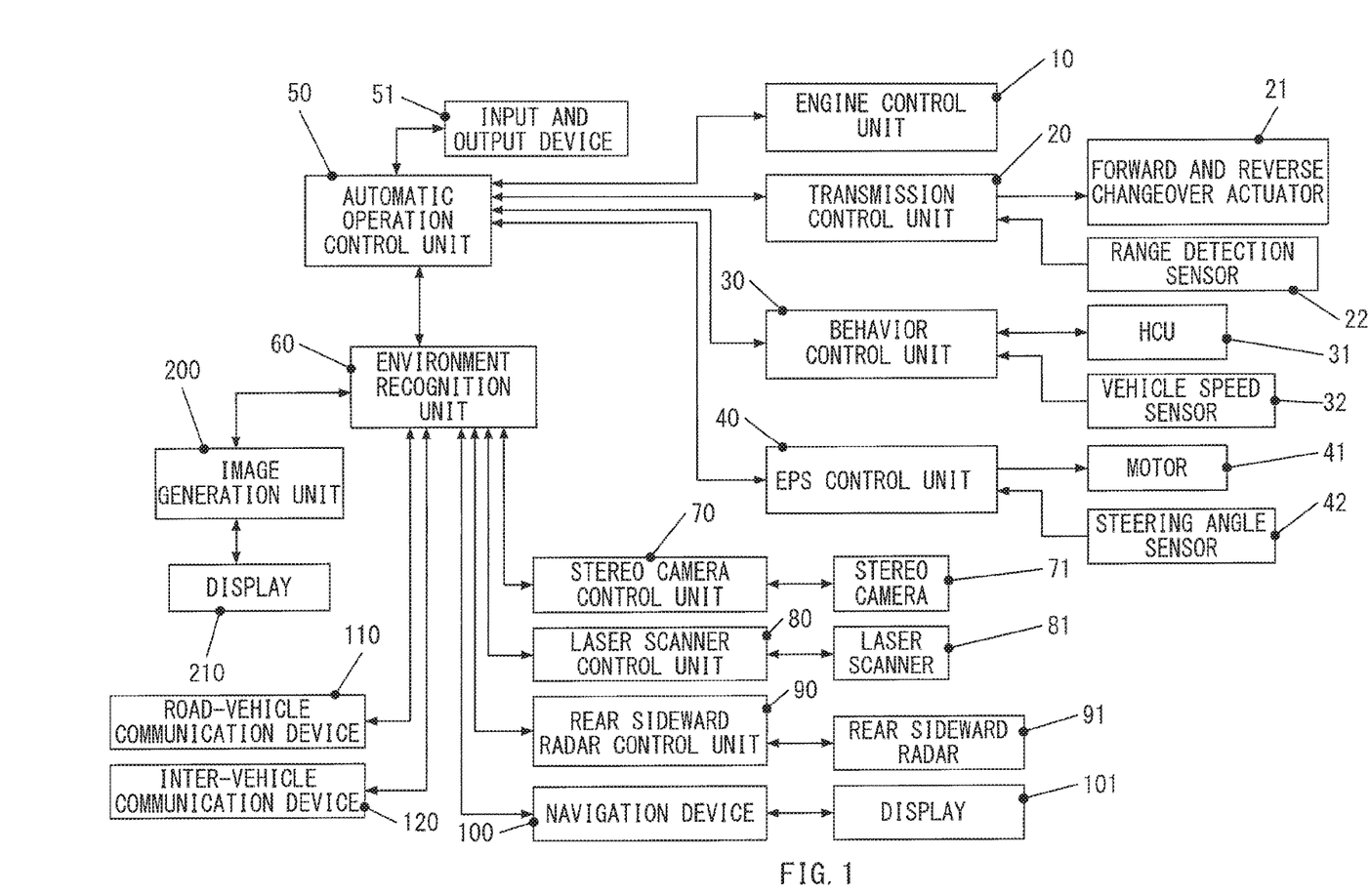
FIG. 1 is a block diagram schematically illustrating a configuration of a vehicle provided with a vehicle control device according to one implementation of the technology.

FIG. 1 is a block diagram schematically illustrating a configuration of a vehicle 1 provided with a vehicle control device according to one implementation of the technology.

The vehicle control device according to the implementation may be mounted on, for example but not limited to, a vehicle 1. The vehicle 1 may be, without limitation, an automobile such as a passenger car, and have a function of automatic operation. The vehicle control device may provide, without limitation, a user with image display of information on situation around an own vehicle. Non-limiting examples of the user may include a driver in manual operation.

The user may check a lane shape or an obstacle forward of the own vehicle, on the basis of the information provided by the vehicle control device. In execution of an automatic operation control, the user may supervise validity of the automatic operation control, on the basis of the information provided by the vehicle control device.

Referring to FIG. 1, the vehicle 1 may include, for example but not limited to, an engine control unit (ECU) 10, a transmission control unit (TCU) 20, a behavior control unit 30, an electric power steering (EPS) control unit 40, an automatic operation control unit 50, an environment recognition unit 60, a stereo camera control unit 70, a laser scanner control unit 80, a rear sideward radar control unit 90, a navigation device 100, a road-vehicle communication device 110, an inter-vehicle communication device 120, an image generation unit 200, and a display 210.

In one implementation of the technology, the environment recognition unit 60, the image generation unit 200, the display 210, and stereo cameras 71 to be described later may serve as a "vehicle control device".

Each of the units as mentioned above may be a unit including, for example but not limited to, an information processor such as a central processing unit (CPU), a storage unit such as a random access memory (RAM) and a read only memory (ROM), an input and output interface, and a bus that couples them together. The units may communicate with one another through an on-vehicle local area network (LAN) system such as a controller area network (CAN) communication system.

The engine control unit 10 may perform a general control of an engine and its auxiliaries. The engine may serve as a traveling power source of the vehicle 1.

As the engine, for example, a four-stroke gasoline engine may be used.

The engine control unit 10 may control, for example but not limited to, throttle valve opening, fuel injection quantity and injection timing, and ignition timing of the engine, to control output torque of the engine.

In a state in which the vehicle 1 is operated in accordance with driving operation of the driver, the engine control unit 10 may control an output of the engine, to allow actual torque of the engine to approximate to torque requested by the driver. The torque requested by the driver may be set on the basis of, for example but not limited to, an operation amount of an accelerator pedal.

In a case of the automatic operation of the vehicle 1, the engine control unit 10 may control the output of the engine, in accordance with an instruction from the automatic operation control unit 50.

The transmission control unit 20 may perform a general control of an undepicted transmission and its auxiliaries. The transmission may change a rotation output of the engine, and make a forward and reverse changeover of the vehicle.

In the case of the automatic operation of the vehicle 1, the transmission control unit 20 may switch ranges such as forward and reverse movements, and set a gear ratio, in accordance with an instruction from the automatic operation control unit 50.

As the transmission, various automatic transmissions may be used. Non-limiting examples may include continuously variable transmission (CVT) of a chain type, a belt type, or a toroidal type, a stepped automatic transmission (AT) including a plurality of planetary gear sets, a dual clutch transmission (DCT), and an automated manual transmission (AMT).

The transmission may include, for example but not limited to, a starting device and a forward and reverse changeover mechanism, besides a transmission mechanism such as a variator. Non-limiting examples of the starting device may include a torque converter, a dry clutch, and a wet clutch. The forward and reverse changeover mechanism may make a changeover between a forward traveling range and a reverse traveling range.

A forward and reverse changeover actuator 21 and a range detection sensor 22, without limitation, may be coupled to the transmission control unit 20.

The forward and reverse changeover actuator 21 may drive a forward and reverse changeover valve, to make the forward and reverse changeover of the vehicle. The forward and reverse changeover valve may switch oil paths that supply oil pressure to the forward and reverse changeover mechanism.

The forward and reverse changeover actuator 21 may include, for example but not limited to, an electric actuator such as a solenoid.

The range detection sensor 22 may be a sensor or a switch that determines which range is currently selected in the transmission, the forward or the reverse.

The behavior control unit 30 may perform an individual control of a wheel cylinder hydraulic pressure of a hydraulic service brake, to perform a behavior control and an antilock brake control. The hydraulic service brake may be provided for each of front and rear wheels. The front wheels may be disposed on right and left sides, and so may be the rear wheels. The behavior control may involve restraining vehicle behavior such as understeering or oversteering. The antilock brake control may involve making a recovery from a wheel lock in braking.

A hydraulic control unit (HCU) 31 and a vehicle speed sensor 32, without limitation, may be coupled to the behavior control unit 30.

The hydraulic control unit 31 may include, for example but not limited to, an electric pump and a valve. The electric pump may apply pressure to a brake fluid that serves as a working fluid of the hydraulic service brake. The valve may make an individual adjustment of the hydraulic pressure supplied to the wheel cylinder of each of the wheels.

In the case of the automatic operation of the vehicle 1, the hydraulic control unit 31 may generate braking power to the wheel cylinder of each of the wheels, in accordance with a braking instruction from the automatic operation control unit 50.

The vehicle speed sensor 32 may be provided in a hub of each of the wheels. The vehicle speed sensor 32 may generate a vehicle speed pulse signal having a frequency proportional to a rotation speed of the wheel.

Detecting the frequency of the vehicle speed pulse signal and performing predetermined operation processing on the frequency detected make it possible to calculate a traveling speed of the vehicle, i.e., a vehicle speed.

The electric power steering control unit 40 may perform a general control of an electric power steering device and its auxiliaries. The electric power steering device may include an electric motor, and provide assistance with steering operation of the driver with use of the electric motor.

A motor 41 and a steering angle sensor 42, without limitation, may be coupled to the electric power steering control unit 40.

The motor 41 may serve as an electric actuator that applies assisting power to a steering system of the vehicle, to provide the assistance with the steering operation of the driver, or changes a steering angle in the automatic operation.

In the case of the automatic operation of the vehicle 1, the motor 41 may impart, in accordance with a steering instruction from the automatic operation control unit 50, torque to the steering system, to allow the steering angle of the steering system to approximate to a predetermined target steering angle. The motor 41 may thereby cause steering to be performed.

The steering angle sensor 42 may detect a current steering angle in the steering system of the vehicle.

The steering angle sensor 42 may include, for example but not limited to, a position encoder that detects an angular position of a steering shaft.

The automatic operation control unit 50 may output a control instruction to, for example but not limited to, the engine control unit 10, the transmission control unit 20, the behavior control unit 30, and the electric power steering control unit 40 as mentioned above, to execute the automatic operation control, in a case in which an automatic operation mode is selected. The automatic operation control may involve allowing the vehicle to travel automatically.

The automatic operation control unit 50 may set a target traveling locus, upon the selection of the automatic operation mode. The setting of the target traveling locus may be provided in accordance with, for example but not limited to, the information on the situation around the own vehicle and an instruction from the undepicted driver. The information on the situation around the own vehicle may be supplied from the environment recognition unit 60. The target traveling locus may be a traveling locus along which the own vehicle ought to travel. The automatic operation control unit 50 may automatically perform, for example but not limited to, acceleration or starting of the vehicle, deceleration or stopping of the vehicle, the forward and reverse changeover, and the steering. The automatic operation control unit 50 may thereby execute the automatic operation that allows the vehicle to automatically travel to a pre-set destination.

The automatic operation mode may be stopped, and be able to return to a manual operation mode, in accordance of a predetermined cancel operation from the user. The return to the manual operation mode may be carried out at a desire of the user for manual operation, or alternatively in a case in which continuation of the automatic operation is difficult. The manual operation mode refers to a mode in which the manual operation by the driver is performed.

An input and output device 51 may be coupled to the automatic operation control unit 50.

The input and output device 51 may output information such as an alarm and various messages to the user from the automatic operation control unit 50. The input and output device 51 may also accept an input of various operations from the user.

The input and output device 51 may include, for example but not limited to, an image display device such as a liquid crystal display (LCD), a sound output device such as a speaker, and an operation input device such as a touch panel.

The environment recognition unit 60 may recognize information on surroundings of the own vehicle.

The environment recognition unit 60 may recognize the obstacle around the own vehicle, and the lane shape of a road on which the own vehicle is traveling, on the basis of information supplied from, for example but not limited to, the stereo camera control unit 70, the laser scanner control unit 80, the rear sideward radar control unit 90, the navigation device 100, the road-vehicle communication device 110, and the inter-vehicle communication device 120. Non-limiting examples of the obstacle may include a stopped vehicle, a traveling vehicle, a building, a geographical feature, a pedestrian, and a cyclist.

The stereo camera control unit 70 may control the stereo cameras 71. The stereo cameras 71 may be provided, in a plurality of pairs, around the vehicle. The stereo camera control unit 70 may perform image processing on an image transmitted from the stereo cameras 71.

Each of the stereo cameras 71 may include, without limitation, a pair of camera units arranged side by side. The camera units may each include, without limitation, an imaging optical system such as a lens, a solid-state imaging element such as a complementary metal oxide semiconductor (CMOS) image sensor, a driver circuit, and a signal processing device.

The stereo camera control unit 70 may recognize a shape of an object captured by the stereo cameras 71 and a relative position to the own vehicle of the object, on the basis of a result of the image processing with utilization of a known stereo image processing technique.

In one specific but non-limiting example, the stereo camera control unit 70 may be able to detect lane lines on both sides of the lane forward of the own vehicle, and to recognize the lane shape.

The stereo cameras 71 may also detect an illumination range of headlights HL, in traveling in a dark place with the headlights HL lighted. The detection of the illumination range of the headlights HL may be made on the basis of a captured image forward of the own vehicle. In one implementation of the technology, the stereo cameras 71 may serve as an "illumination range detector".

The laser scanner control unit 80 may control the laser scanners 81. The laser scanner control unit 80 may recognize various objects as three-dimensional (3D) point group data, on the basis of an output of the laser scanners 81. Non-limiting examples of the various objects may include another vehicle and the obstacle around the vehicle.

The rear sideward radar control unit 90 may control the rear sideward radar 91. The rear sideward radar 91 may be provided on right and left side parts of the vehicle. The rear sideward radar control unit 90 may detect an object that exists rear sideward of the own vehicle, on the basis of an output of the rear sideward radar 91.

The rear sideward radar 91 may detect, for example, another vehicle that approaches from rear sideward of the own vehicle.

As the rear sideward radar 91, radar such as laser radar and millimeter-wave radar may be used.

Figure 2:
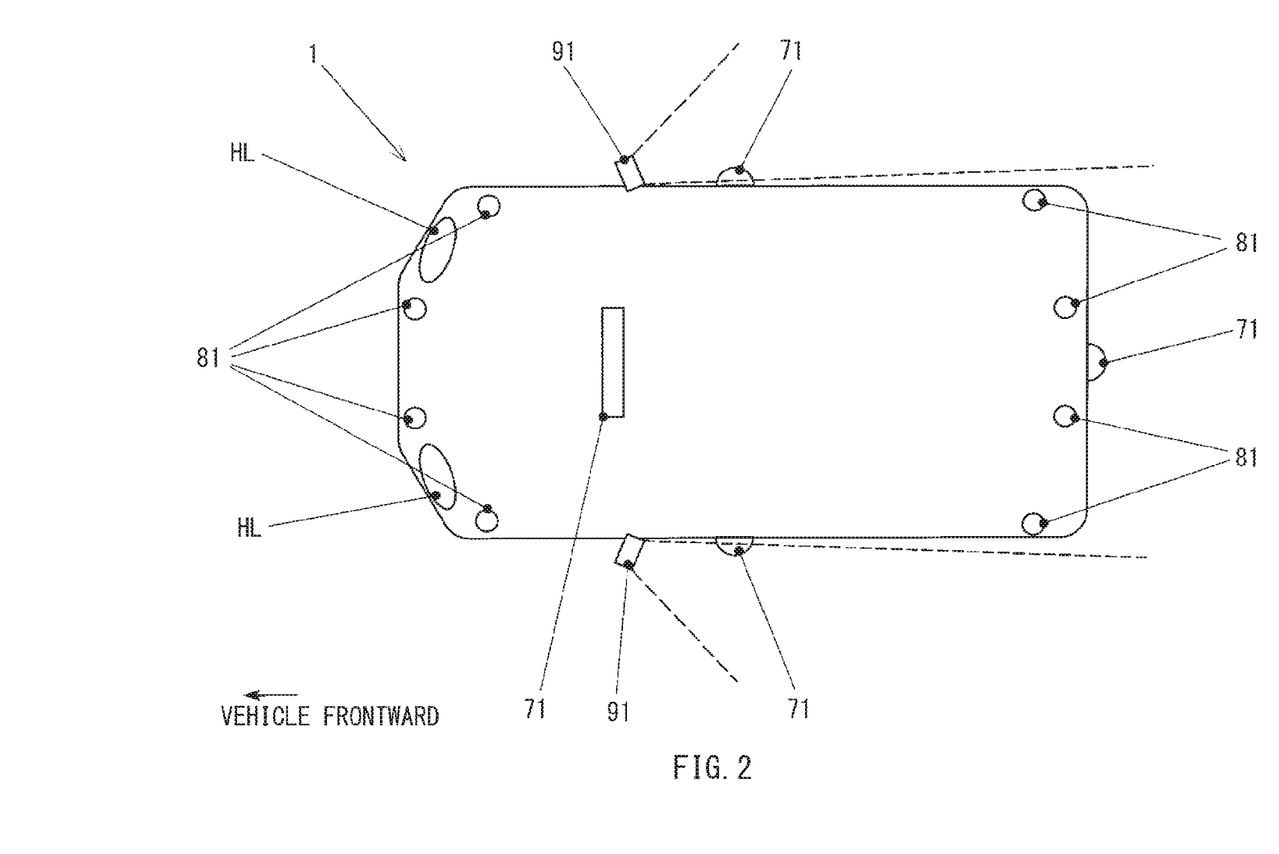
FIG. 2 schematically illustrates disposition of sensors that recognize a periphery of the vehicle, in the vehicle according to the implementation.

FIG. 2 provides schematic illustration of disposition of the sensors that recognize the surroundings of the vehicle, in the vehicle according to this implementation.

The stereo cameras 71 may be disposed in a front part, a rear part, and the right and left side parts of the vehicle 1.

The laser scanners 81 may be provided in a plurality, and in a distribution pattern that substantially prevents a dead angle around the vehicle 1.

The rear sideward radar 91 may be disposed on, for example but not limited to, the right and left side parts of a vehicle body of the vehicle 1, with its detection range directed rearward of the vehicle and outward in a width direction of the vehicle.

The headlights HL may be provided in a pair, on the right and left sides of a front end part of the vehicle body of the vehicle 1.

The headlights HL may each include, for example but not limited to, a light source and an optical system. The light source may include, without limitation, a high intensity discharge (HID) lamp or a light emitting diode (LED). The optical system may project light generated by the light source, in a forward direction, and in a predetermined pattern of light distribution.

The headlights HL may have a plurality of different patterns of the light distribution, and be able to switch the patterns of the light distribution. Non-limiting examples of the patterns of the light distribution may include traveling light distribution, i.e., high beam, and interfering light distribution, i.e., low beam.

The navigation device 100 may include, for example but not limited to, an own-vehicle positioning unit such as a global positioning system (GPS) receiver, a data accumulation unit, and a gyro sensor. The data accumulation unit may accumulate map data prepared in advance. The gyro sensor may detect an azimuth of a front and rear direction of the own vehicle.

The map data may include road information for each lane. Non-limiting examples of the road information may include a road, an intersection, and an interchange.

The road information may include not only three-dimensional data of the lane shape but also information on traveling restriction such as permission or non-permission to make a right turn or a left turn, a temporary stop position, and a speed limit of each lane.

The navigation device 100 may include a display 101. The display 101 may be incorporated in an instrumental panel.

The display 101 may be an image display device that displays various pieces of information outputted to the driver by the navigation device 100.

The display 101 may include a touch panel, and serve as an input unit on which various operation inputs from the driver may be made.

The road-vehicle communication device 110 may communicate with an undepicted ground station by a communication system in conformity with a predetermined standard. The road-vehicle communication device 110 may thereby acquire information regarding, for example but not limited to, traffic congestion, lighting states of traffic signals, road construction, a scene of a traffic accident, lane regulation, weather, and road surface conditions.

The inter-vehicle communication device 120 may communicate with another vehicle undepicted, by a communication system in conformity with a predetermined standard. The inter-vehicle communication device 120 may thereby acquire information on a vehicle state of another vehicle and information on a vehicle attribute of another vehicle. Non-limiting examples of the information on the vehicle state of another vehicle may include a position, an azimuth angle, acceleration, and a speed of another vehicle. Non-limiting examples of the information on the vehicle attribute of another vehicle may include a vehicle model and a vehicle size of another vehicle.

The image generation unit 200 may generate an environment image, on the basis of a result of environment recognition transmitted from the environment recognition unit 60. The environment image may be an image that includes information regarding the environment around the own vehicle. The environment image may be displayed on the display 210. In one implementation of the technology, the environment image may serve as an "environment image".

The display 210 may be an image display device disposed in confronted relation to the occupant of the vehicle.

The display 210 may include, for example, a liquid crystal display (LCD) incorporated in an interior member such as the instrumental panel.

Description is given next of image display operation of the vehicle control device according to this implementation, and one example of image display.

Figure 3:
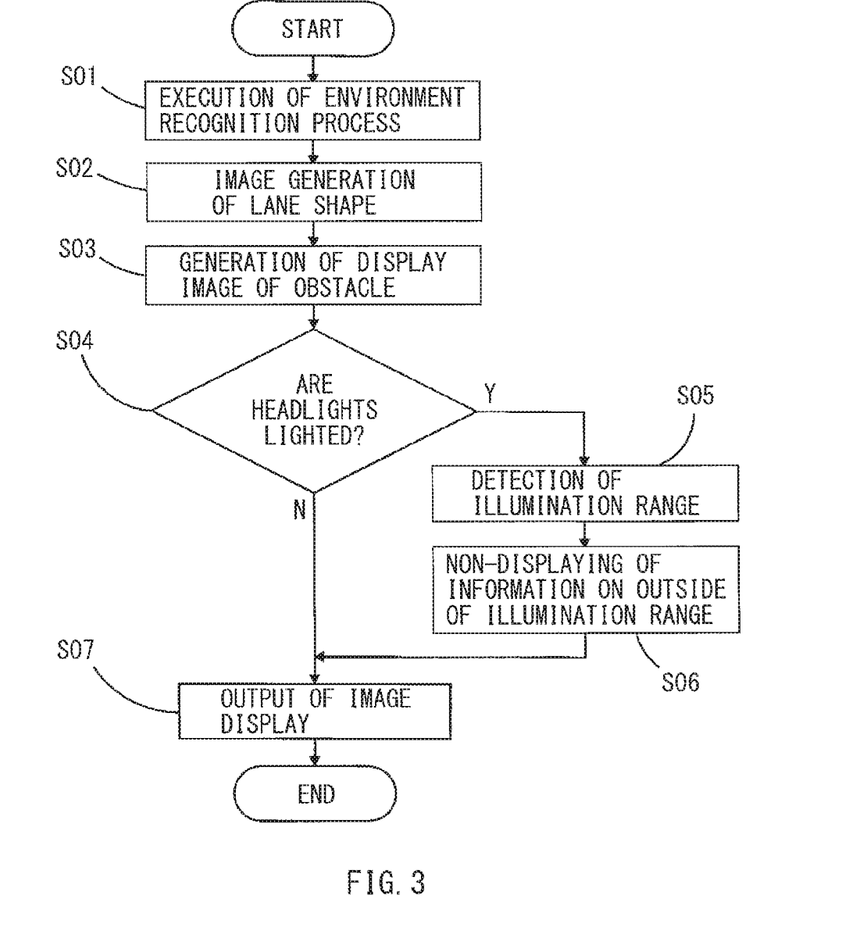
FIG. 3 is a flowchart illustrating operation of the vehicle control device according to the implementation.

FIG. 3 is a flowchart of the operation of the vehicle control device according to this implementation. In the following, description of each step is given in the order of a sequence of steps.

[Step S01: Execution of Environment Recognition Process]

The environment recognition unit 60 may perform the environment recognition, mainly, forward of the vehicle 1.

The environment recognition unit 60 may perform sensing of the lane shape forward of the vehicle 1, and the obstacle such as another vehicle. Thereafter, the environment recognition unit 60 may transmit a result of the recognition or a result of the sensing, to the image generation unit 200.

Thereafter, the flow may proceed to step S02.

[Step S02: Image Generation of Lane Shape]

The image generation unit 200 may generate an image of the lane shape, on the basis of the information from the environment recognition unit 60.

The image of the lane shape may be allowed to incorporate a lane width detected in, for example but not limited to, lane line detection processing with use of the stereo cameras 71, without limitation. This allows the lane shape to be displayed as an image having a lane width.

Thereafter, the flow may proceed to step S03.

[Step S03: Generation of Display Image of Obstacle]

The image generation unit 200 may generate a display image of the obstacle, on the basis of the information from the environment recognition unit 60. Non-limiting examples of the obstacle may include another vehicle, the pedestrian, the cyclist, a falling object, and the building.

The display image of the obstacle may be generated as computer graphics simplified with details or other parts omitted.

The display image of the obstacle may be displayed and superimposed on the image of the lane shape, in corresponding positional relation.

Thereafter, the flow may proceed to step S04.

[Step S04: Determination of Lighting of Headlights]

The image generation unit 200 may detect whether or not the vehicle is traveling in the dark place with the headlights HL in a lighted state.

Determination on the dark place and the lighted state of the headlights HL may be made on the basis of the environment image of the stereo cameras 71.

In one alternative, determination on the dark place and a state of the headlights HL may be made with use of a headlight control unit or an illuminance sensor. The headlight control unit may switch lighting and extinction of the headlights HL. The illuminance sensor may be used in an automatic lighting control of the headlights HL.

The dark place as used here refers to, for example but not limited to, an inside of a tunnel, a place under a bridge, and an indoor place such as an indoor parking lot, in addition to an outdoor place at night.

When the vehicle is traveling in the dark place and the headlights HL are in the lighted state (Y in step S04), the flow may proceed to step S05. Otherwise (N in step S04), the flow may proceed to step S07.

[Step S05: Detection of Illumination Range]

The environment recognition unit 60 may detect the illumination range, on the basis of the captured image of the stereo cameras 71. The illumination range may be a range illuminated by the headlights HL. The environment recognition unit 60 may transmit information thus acquired, to the image generation unit 200.

The detection of the illumination range may be made, for example, as follows. The headlights HL may be allowed to blink at too short cycles to visually distinguish, and in a predetermined pattern. A region may be detected as the illumination range that corresponds to positions of pixels whose change in luminance in the captured image coincide with the pattern of the blinking.

Thereafter, the flow may proceed to step S06.

[Step S06: Non-Displaying of Information on Outside of Illumination Range]

The image generation unit 200 may cause non-displaying of display regarding, for example, an object that exists in an outer region of the illumination range, in the image generated in steps S01 to S03.

At this occasion, when a whole range recognizable by the environment recognition unit 60 is included in the illumination range, the image generation unit 200 may keep from performing the non-displaying processing, and display all the recognition result.

Thereafter, the flow may proceed to step S07.

[Step S07: Output of Image Display]

The image generation unit 200 may output the image data generated, and allow the display 210 to display the image and to provide the user with the image.

Thereafter, the series of processing may be ended, or the flow may be allowed to return.

In the following, description is given of a specific but non-limiting display example in the vehicle control device according to this implementation.

Figure 4:
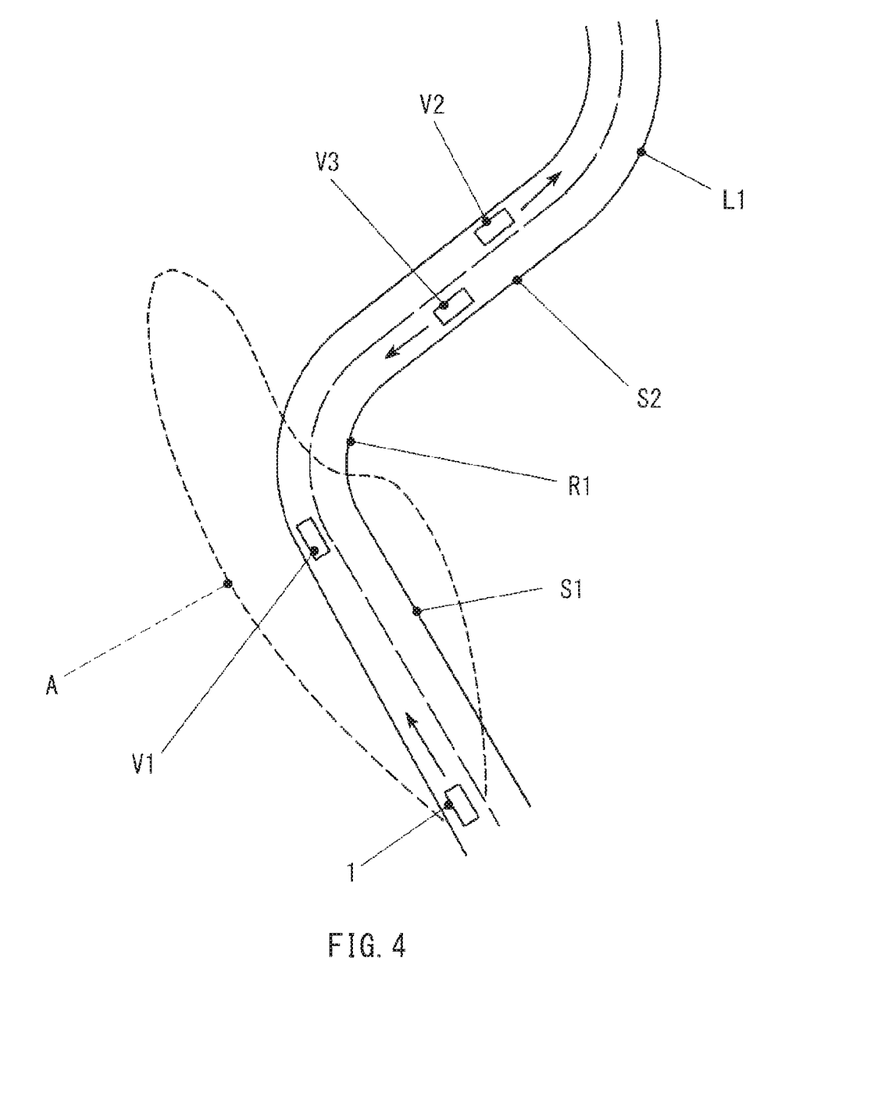
FIG. 4 schematically illustrates one example of road environment in which the vehicle provided with the vehicle control device according to the implementation travels.

FIG. 4 schematically illustrates one example of road environment in which the vehicle provided with the vehicle control device according to this implementation travels.

In the example illustrated in FIG. 4, the vehicle 1 may be traveling on a road for left-side traffic that includes one lane on each side. The same may apply to FIG. 6 described later.

A straight track S1, a right corner R1, a straight track S2, and a left corner L1 may be provided forward of the vehicle 1, in the order of closeness to the vehicle 1.

Another vehicle V1 as a preceding vehicle may be traveling forward on the straight track S1.

Another vehicle V2 as the preceding vehicle and another vehicle V3 as an oncoming vehicle may be traveling on the straight track S2.

The illumination range A of the headlights HL of the vehicle 1 may include a region from the straight track S1 to the vicinity of an intermediate part of the right corner R1, but may not include a region farther than the straight track S2.

It is, therefore, substantially impossible or extremely difficult for the occupant to visually check the region farther than the straight track S2, even if the lane shape is recognized by the navigation device 100, or even if the information on another vehicle V2 or V3 is acquired by the road-vehicle communication device 110 or the inter-vehicle communication device 120.

Accordingly, in this implementation, information regarding an outside of the illumination range A may be intentionally excluded from the display of the environment image or a display image G1, even if the information is recognizable by the environment recognition unit 60.

Figure 5:
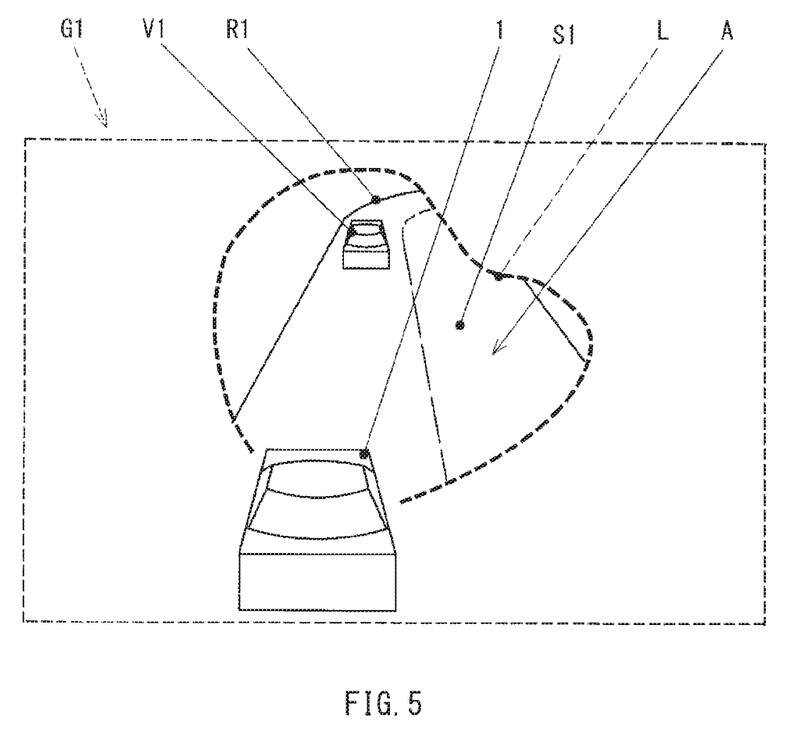
FIG. 5 schematically illustrates one example of display on a screen in a case illustrated in FIG. 4.

FIG. 5 schematically illustrates one example of display on a screen in the case of FIG. 4.

The display image G1 may be a depiction of the vehicle 1 and the situation forward of the vehicle 1. The depiction may be made by computer graphics simplified with details omitted.

The image generation unit 200 may have a function of performing rendering of such computer graphics.

The display image G1 may be, without limitation, an overhead view or a bird's eye view, as viewed from a virtual viewpoint disposed upward and obliquely rearward of the vehicle 1, as illustrated in FIG. 5.

The display image G1 may include an image of the lane shape that includes the straight track S1 and extends to the intermediate part of the right corner R1.

A region farther than the intermediate part of the right corner R1 may be non-displayed.

Another vehicle V1 that exists inside the illumination range A of the headlights HL may be displayed and superimposed on the display of the straight track S1, by computer graphics with details omitted.

Meanwhile, another vehicle V2 or V3 that exists outside the illumination range A may be non-displayed even if the environment recognition unit 60 recognizes them with any one of the units included in the environment recognition unit 60.

The display image G1 may further display a line L that indicates an outer edge of the illumination range A.

As described, according to the vehicle control device of this implementation, it is possible to produce effects as follows.

(A) The information on the region that is not included in the illumination range A of the headlights HL and does not allow for confirmation by visual checking may be non-displayed. This allows for prevention of the traveling of the vehicle 1 on the basis of the information that is not available for the check by the user himself or herself. Hence, it is possible to keep the user from placing too much confidence in the environment recognition unit in traveling in the dark place.

Moreover, the obstacle that moves into the illumination range A of the headlights HL from the outside of the illumination range A may be easily recognized as a change point, upon the entry into the illumination range A and the start of the display. Hence, it is possible to maintain cautiousness of the user.

(B) The line L that indicates the outer edge of the illumination range A may be displayed. This allows the user to recognize that the information on an outside of the line L is currently ungraspable. Hence, it is possible to urge the user to perform careful supervision of the automatic operation control or more careful driving operation.

(C) The illumination range of the headlights HL may be detected on the basis of the captured image forward of the own vehicle. Hence, it is possible to appropriately detect the illumination range, regardless of influences of, for example but not limited to, unevenness, a change in gradient, or waviness of a road surface, and a shelter that blocks light rays from the headlights HL.

[Modifications]

The technology is by no means limited to the implementations described above. It should be appreciated that modifications and alterations may be made, and the technology is intended to include such modifications and alterations.

(A) The configurations of the vehicle control device or the configurations of the vehicle are not limited to the implementations described above, but may be modified or altered as appropriate. In the forgoing implementations, the vehicle may be a passenger car, but the technology may be also applicable to a commercial vehicle such as a cargo vehicle, a truck, a bus, a motorcycle, and other various special vehicles.

(B) In the forgoing implementations, the vehicle may utilize the engine as the traveling power source. However, the technology is not limited thereto. The vehicle may utilize, as the traveling power source, an electric motor or a hybrid system as a combination of the engine and the electric motor.

(C) The kinds or the disposition of the sensors that perform the environment recognition around the own vehicle are not limited to as exemplified in the forgoing implementations, but may be modified or altered as appropriate. For example, various sensors may be utilized together with, or may be replaced with, the sensors as exemplified in the forgoing implementations. Non-limiting examples of the sensors may include the millimeter-wave radar, the laser radar, a monocular camera, and ultrasonic sonar.

Moreover, the environment recognition may be made with use of information acquired by road-vehicle communication or inter-vehicle communication, or map data of a positioning unit such as the GPS and the navigation device, in replacement for, or together with, the sensors mounted on the vehicle itself.

(D) In the forgoing implementations, the example of the image display may be provided in the overhead view or the bird's eye view, but this is non-limiting. In one alternative example, the image display may be provided in a plan view, or in a driver's view as viewed from a viewpoint of a virtual driver. In another alternative, a 3D display may be provided with use of a display that is able to provide 3D display. Moreover, in the forgoing implementations, the image display may be provided on the display incorporated in the instrumental panel, but this is non-limiting. In one alternative example, the image display may be provided with a head up display that projects an image on a windscreen.

(E) In the forgoing implementations, the illumination range of the headlights may be detected with use of, for example, the result of the capturing of the camera, but this is non-limiting. The detection of the illumination range may be made with other techniques.

In one alternative, information on a pattern of projection may be stored in advance. The pattern of the projection may be a pattern formed by projection of the pattern of the light distribution of the headlights. The pattern of the projection may be detected as the illumination range. In this alternative, it is possible to detect the illumination range with a simple configuration having a relatively small computation load of the device.

In another alternative, the headlights may be able to perform variable light distribution, or perform automatic switching between the traveling light distribution, i.e., the high beam, and the interfering light distribution, i.e., the low beam. In this case, information on a current pattern of the light distribution may be acquired from a controller that performs a light distribution control or a switching control, to detect the illumination range on the basis thereof.

In one implementation described above, the image generation unit 200 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image generation unit 200. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control device comprising:
an image capturing device that captures a first environment image of surrounding environment of a vehicle;
an illumination range detector that 1) detects luminance of headlights of the vehicle blinking in a blinking pattern in which the headlights blink at predetermined cycles, and 2) identifies, within the first environment image, a group of pixels experiencing changes in luminance, the changes of the luminance of the group of pixels coinciding with the blinking pattern of the headlights;
an image generator that generates a second environment image based on the identified group of pixels in the first environment image, wherein a first region in the second environment image that corresponds to a position of the identified group of pixels in the first environment image is processed to be displayed, and a second region in the second environment image that corresponds to a position of a group of other pixels in the first environment image is processed to be excluded from being displayed; and a display that displays the second environment image.

2. The vehicle control device according to claim 1, wherein the second environment image includes depiction of an outer edge of the first region.

3. The vehicle control device according to claim 1, wherein the image capturing device captures an image forward of the vehicle, and wherein the illumination range detector detects, as the first region, a range in which the image capturing device detects reflection light of illumination light of the headlights.

4. The vehicle control device according to claim 2, wherein the image capturing device captures an image forward of the vehicle, and wherein the illumination range detector detects, as the first region, a range in which the image capturing device detects reflection light of illumination light of the headlights.

5. The vehicle control device according to claim 1, wherein the illumination range detector identifies the group of pixels in the first environment image on a basis of information on a pattern of light distribution of the headlights.

6. A vehicle, comprising:

headlights that blinks in a blinking pattern in which the headlights blink at predetermined cycles;

an image capturing device that captures a first environment image surrounding the vehicle;

an illumination range detector that identifies, within the first environment image, a group of pixels experiencing changes in luminance, the changes of the luminance of the group of pixels coinciding with the blinking pattern of the headlights;

an image generator that generates a second environment image based on the identified group of pixels in the first environment image, wherein a first region in the second environment image that corresponds to a position of the identified group of pixels in the first environment image is processed to be displayed, and wherein a second region in the second environment image that corresponds to a position of a group of other pixels in the first environment image is processed to be excluded from being displayed; and a display that displays 1) the second environment image when the first environment image includes the group of pixels the luminance of which changes according to the blinking pattern of the headlights and 2) the first environment image when the first environment image does not include the group of pixels the luminance of which changes according to the blinking pattern of the headlights.

7. A vehicle control device, comprising:

a circuitry that:

receives, from an image capturing device, a first image of an environment surrounding a vehicle;

receives, from headlights of the vehicle, a blinking pattern of the headlights, the blinking pattern in which the headlights blink at predetermined cycles;

identifies, within the first image, a group of pixels experiencing changes in luminance, the changes in the luminance of the group of pixels match the received blinking pattern of the headlights;

generates a second image based on the identified group of pixels in the first image, wherein a first region in the second image that corresponds to a position of the identified group of pixels in the first image is processed to be displayed, and wherein a second region in the second image that corresponds to a position of a group of other pixels in the first image is processed to be excluded from being displayed; and displays, on a display, the generated second image.

* * * * *